(12) United States Patent
Itabashi et al.

(10) Patent No.: US 10,526,209 B2
(45) Date of Patent: Jan. 7, 2020

(54) MSE-TYPE ZEOLITE PRODUCTION METHOD

(71) Applicants: MITSUI MINING & SMELTING CO., LTD., Tokyo (JP); The University of Tokyo, Tokyo (JP)

(72) Inventors: Keiji Itabashi, Tokyo (JP); Shanmugam Palani Elangovan, Tokyo (JP); Sibel Sogukkanli, Tokyo (JP); Tatsuya Okubo, Tokyo (JP)

(73) Assignees: MITSUI MINING & SMELTING CO., LTD., Tokyo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 16/096,207

(22) PCT Filed: Apr. 26, 2017

(86) PCT No.: PCT/JP2017/016605
§ 371 (c)(1),
(2) Date: Oct. 24, 2018

(87) PCT Pub. No.: WO2017/188341
PCT Pub. Date: Nov. 2, 2017

(65) Prior Publication Data
US 2019/0135647 A1 May 9, 2019

(30) Foreign Application Priority Data

Apr. 26, 2016 (JP) ................... 2016-088588

(51) Int. Cl.
| | | |
|---|---|---|
| *C01B 39/48* | (2006.01) | |
| *B01J 29/70* | (2006.01) | |
| *B01J 37/10* | (2006.01) | |
| *B01J 29/04* | (2006.01) | |
| *B01J 35/10* | (2006.01) | |

(52) U.S. Cl.
CPC ............ *C01B 39/48* (2013.01); *B01J 29/70* (2013.01); *B01J 37/10* (2013.01); *B01J 29/041* (2013.01); *B01J 35/1038* (2013.01); *C01P 2002/72* (2013.01)

(58) Field of Classification Search
CPC ........ C01B 39/48; B01L 29/041; B01L 29/70; B01L 37/10; C01P 2002/72
See application file for complete search history.

(56) References Cited

U.S. PATENT DOCUMENTS

| | | | | |
|---|---|---|---|---|
| 8,025,863 B2 * | 9/2011 | Strohmaier | ............. | C01B 37/02 423/706 |
| 8,053,618 B1 * | 11/2011 | Moscoso | ................. | B01J 29/80 208/27 |
| 8,247,631 B2 | 8/2012 | Nicholas et al. | | |
| 9,504,995 B2 * | 11/2016 | Burton | .................... | C01B 39/48 |
| 2010/0081775 A1 | 4/2010 | Moscoso et al. | | |
| 2014/0140921 A1 | 5/2014 | Burton et al. | | |
| 2014/0322126 A1 | 10/2014 | Kubota et al. | | |

FOREIGN PATENT DOCUMENTS

| | | |
|---|---|---|
| EP | 2300370 | 3/2011 |
| JP | 2002535227 | 10/2002 |
| JP | 2013129590 A2 | 7/2013 |
| JP | 2013212488 A2 | 10/2013 |
| JP | 2015534939 | 12/2015 |
| JP | 2012504105 | 2/2016 |
| WO | 2009154783 | 12/2009 |

OTHER PUBLICATIONS

Dorset et al., Crystal Structure of Zeolite Mcm-68: a New Three-Dimensional Framework with Large Pores, Journal of Physical Chemistry, B 2006, 110, pp. 2045-2050.
Baerlocher et al., Atlas of Zeolite Framewok Types, Elsevier, Published on behalf International Zeolite Association, Sixth Revised Edition, 2007, pp. 222-223.
Koyama et al., A Multi-Dimensional Microporous Silicate That is Isomorphous to Zeolite MCM-68, Angewandte Chemie International Edition, 47, 2008, pp. 1042-1046.
Inagaki et al., Rapid Synthesis of an Aluminum-Rich MSE-Type Zeolite by the Hydrothermal Conversion of an FAU-Type Zeolite, Chemistry A-European Journal, 19, 2013. pp. 7780-7786.
Kubota et al., Effective Fabrication of Catalysts from Large-Pore, Multidimensional Zeolites Synthesized without Using Organic Structure-Directing Agents, Chemistry of Materials, 26, 2014, pp. 1250-1259.
S. Sogukkanli et al., Rational seed-directed synthesis of MSE-type zeolites using a simple organic structure-directing agent by extending the composite building unit hypothesis, Microporous and Mesoporous Materials, 2017, 245, 1-7.

(Continued)

*Primary Examiner* — David M Brunsman
(74) *Attorney, Agent, or Firm* — Rankin, Hill & Clark LLP (57) ABSTRACT

The objective of the invention is to provide an MSE-type zeolite production method such that an MSE-type zeolite can be produced in a comparatively short heating time by using inexpensive tetraethylammonium ion. The production method of the present invention comprises steps of:
(1) mixing a silica source, an alumina source, an alkali source, tetraethylammonium ion, and water in such a manner as to yield a reaction mixture of the composition represented by the molar ratios indicated below:
$SiO_2/Al_2O_3$=between 10 and 100 inclusive
$(Na_2O+K_2O)/SiO_2$=between 0.15 and 0.50 inclusive
$K_2O/(Na_2O+K_2O)$=between 0.05 and 0.7 inclusive
$TEA_2O/SiO_2$=between 0.08 and 0.20 inclusive
$H_2O/SiO_2$=between 5 and 50 inclusive;
(2) using the MSE-type zeolite as a seed crystal, and adding this seed crystal to the mixture at a proportion of 5 to 30% by mass with respect to the silica component in the reaction mixture; and
(3) heating, under hermetic seal at a temperature of 100 to 200° C., the reaction mixture whereto the seed crystal has been added.

5 Claims, 10 Drawing Sheets

(56) References Cited

OTHER PUBLICATIONS

International Search Report (ISR) dated Jun. 6, 2017 filed in PCT/JP2017/016605.
Extended European Search Report (EESR) dated May 15, 2019 issued in the corresponding European patent application No. 17789623.0.

* cited by examiner

MSE-TYPE ZEOLITE PRODUCTION METHOD

TECHNICAL FIELD

The present invention relates to a production method of MSE-type zeolite (MCM-68).

BACKGROUND ART

Zeolite MCM-68 is the first porous aluminosilicate synthesized by Mobile (Patent Document 1) and is characterized by three-dimensional pore structures consisting of 10- and 12-membered rings (Non-Patent Document 1). The structure of this zeolite is unique to MCM-68 and MSE is given as a Frame Type Code of its structure (Non-Patent Document 2). As a zeolite having the same structure as the MSE type zeolite, UZM-35 (Patent Document 2), YNU-2 (Non-Patent Document 3), YNU-3 (Non-Patent Document 4) and the like are known.

The $SiO_2/Al_2O_3$ molar ratios of these MSE-type zeolites range between 18 to 25 and are reported to be highly active in solid acid catalysts, particularly alkylation of aromatic hydrocarbons and transalkylation, isomerization, disproponation and dealkylation of alkyl aromatic hydrocarbons because of their relatively high Al content (Patent Document 3).

Patent Document 1: Japanese Unexamined Patent Application (Translation of PCT Application), Publication No. 2002-535227
Patent Document 2: Japanese Unexamined Patent Application (Translation of PCT Application), Publication No. 2012-504105
Patent Document 3: U.S. Pat. No. 8,025,863B2
Non-Patent Document 1: Journal of Physical Chemistry, B, 110, 2045-2050 (2006)
Non-Patent Document 2: ATLAS OF ZEOLITE FRAMEWORK TYPES, Sixth Revised Edition, 222-223 (2007), ELSEVIER, Published on behalf International Zeolite Association
Non-Patent Document 3: Angewandte Chemie International Edition, 47, 1042-1046 (2008)
Non-Patent Document 4: Chemistry A—European Journal, 19, 7780-7786 (2013)
Non-Patent Document 5: Chemistry of Materials, 26, 1250-1259 (2014)

DISCLOSURE OF THE INVENTION

Problems to be Solved by the Invention

Addition of an organic structure-directing agent (OSDA) is essential for the synthesis of these MSE-type zeolites; for example, for the synthesis of MCM-68 as well as YNU-2 and YNU-3, diamines with complex cyclic structures such as N,N,N',N'-tetraalkylbicyclo[2,2,2]octa-7-ene-2,3:5,6-dipyrrolidinium dication or N,N,N',N'-tetraalkylbicyclo[2,2,2]octane-2,3:5,6-dipyrrolidinium dication are used. For the synthesis of UZM-35, dimethyldipropylammonium cation is used. These OSDAs are not only complicated in structure but also expensive, so that the costs of the synthesized MSE-type zeolites are high and the high cost has been a hurdle for industrial use of the MSE-type zeolites.

In addition, as Non-Patent Document 5, the Applicant previously proposed a method for producing an MSE-type zeolite without using an OSDA, wherein an MSE-type zeolite produced using an OSDA is fired to eliminate the OSDA in the zeolite and then the obtained calcined product is used as a seed crystal. However, the process disclosed in Non-Patent Document 5 aims at producing an MSE-type zeolite without using an OSDA and is directed to the opposite direction to an invention for producing an MSE-type zeolite using an inexpensive OSDA as in the present invention. It is therefore an object of the present invention to provide a method for producing an MSE-type zeolite which can solve the above-mentioned drawbacks of prior art, and in particular, to provide a method for producing an MSE-type zeolite which utilizes an inexpensive OSDA.

Means for Solving the Problems

The present invention solves the above-mentioned problems by providing a method for producing an MSE-type zeolite comprising the steps of:
(1) mixing a silica source, an alumina source, an alkali source, tetraethylammonium ions and water so as to obtain a reaction mixture having a composition represented by molar ratios indicated below:
$SiO_2/Al_2O_3$=10 or more and 100 or less,
$(Na_2O+K_2O)/SiO_2$=0.15 or more and 0.50 or less,
$K_2O/(Na_2O+K_2O)$=0.05 or more and 0.7 or less,
$TEA_2O/SiO_2$=0.08 or more and 0.20 or less and
$H_2O/SiO_2$=5 or more and 50 or less
(in the formula, TEA represents tetraethylammonium ion);
(2) using an MSE-type zeolite as a seed crystal and adding this to the reaction mixture at a ratio of 5% by mass or more and 30% by mass or less with respect to the silica component in the reaction mixture; and
(3) heating the reaction mixture to which the seed crystal has been added, at a temperature of 100 to 200° C. in a hermetically sealed manner.

Effects of the Invention

According to the method of the present invention, MSE-type zeolites can be produced in relatively short heat time by adding an MSE-type zeolite seed crystal and using less expensive tetraethylammonium ions. The present invention also provides a production method with a wide selection of seed crystals.

PREFERRED MODE FOR CARRYING OUT THE INVENTION

Hereinafter, the present invention will be described based on preferred embodiments thereof. The method for producing an MSE-type zeolite according to the present invention comprises a step of mixing and heating a reaction mixture containing a silica source, an alumina source, an alkali source, tetraethylammonium ions and water with a seed crystal consisting of an MSE-type zeolite.

One of the features of the present production method is that an inexpensive OSDA of tetraethylammonium ions is used. The use of tetraethylammonium ions not only reduces the raw material cost, but also shortens the production time as compared with the methods disclosed in Patent Document 1 or the like.

Examples of the tetraethylammonium ion source include tetraethylammonium hydroxide (TEAOH), tetraethylammonium bromide, tetraethylammonium chloride and the like. Using tetraethylammonium hydroxide (TEAOH) is preferable because the tetraethylammonium ion source having a function as an OSDA can also be used as an alkali source.

Examples of the silica source include silica and a silicon-containing compound capable of generating silicate ions in water. Specific examples thereof may include wet process silica, dry process silica, colloidal silica, sodium silicate and aluminosilicate gel. These silicon sources can be used singly or in combination of two or more kinds thereof. Among these silicon sources, it is preferable to use silica (silicon dioxide) from the viewpoint of being able to obtain the intended MSE zeolite without being accompanied with unnecessary by-products.

As the alumina source, for example, a water-soluble aluminum-containing compound can be used. Specific examples thereof may include sodium aluminate, aluminum nitrate and aluminum sulfate. In addition, aluminum hydroxide is also a suitable alumina source. These alumina sources can be used singly or in combination of two or more kinds thereof. Among these aluminum sources, it is preferable to use sodium aluminate or aluminum hydroxide from the viewpoint of being able to obtain zeolite without being accompanied with unnecessary by-products (for example, a sulfate and a nitrate).

As the alkali source, for example, potassium hydroxide and sodium hydroxide can be used in addition to the above-mentioned TEAOH. When potassium silicate is used as a silica source or when potassium aluminate is used as an alumina source, the alkali metal component, potassium, contained therein is simultaneously considered to be KOH and is also an alkali component. Thus, the $K_2O$ is calculated as the sum of all potassium-containing components in the reaction mixture. Similarly, when sodium silicate is used as a silica source or when sodium aluminate is used as an alumina source, the alkali metal component, sodium, contained therein is simultaneously considered to be NaOH and is also an alkali component. Thus, the $Na_2O$ is calculated as the sum of all sodium-containing components in the reaction mixture. In the present invention, it is essential to use both a potassium component and a sodium component. Incidentally, in order to adjust the $K_2O/(Na_2O+K_2O)$ molar ratio, a potassium salt such as potassium chloride, potassium sulfate and potassium nitrate may be used as a potassium ion source other than the above and a sodium salt such as sodium chloride, sodium sulfate and sodium nitrate may be used as a sodium source.

As a reaction mixture to be mixed with a seed crystal, a mixture obtained by mixing a silica source, an alumina source, an alkali source, a tetraethylammonium ion source and water so as to have a composition represented by the following molar ratios is used:

$SiO_2/Al_2O_3$=10 or more and 100 or less, in particular, 15 or more and 70 or less;

$(Na_2O+K_2O)/SiO_2$=0.15 or more and 0.50 or less, in particular, 0.20 or more and 0.30 or less;

$K_2O/(Na_2O+K_2O)$=0.05 or more and 0.7 or less, in particular, 0.1 or more and 0.6 or less, $TEA_2O/SiO_2$=0.08 or more and 0.20 or less, in particular, 0.1 or more and 0.15 or less and $H_2O/SiO_2$=5 or more and 50 or less, in particular 10 or more and 30 or less (in the formula, TEA represents a tetraethylammonium ion)

When the molar ratio of $TEA_2O/SiO_2$ in the reaction mixture is 0.08 or more, the MSE-type zeolite can be efficiently produced. When the molar ratio of $TEA_2O/SiO_2$ is 0.20 or less, the MSE-type zeolite can be securely produced. Since the molar ratio of $TEA_2O/SiO_2$ in the present invention is as low as 0.08 or more and 0.20 or less, the amount of OSDA can be reduced. The molar ratio of $K_2O/(Na_2O+K_2O)$ in the reaction mixture is 0.7 or less, whereby the MSE-type zeolite can be produced while impurities being suppressed and the molar ratio of $K_2O/(Na_2O+K_2O)$ is 0.15 or more, whereby the MSE-type zeolite can be securely produced. Further, the value of $(Na_2O+K_2O)/SiO_2$ in the reaction mixture is 0.50 or less in the present invention and this enables to suppress reduction in yield due to the reaction mixture becoming excessively alkaline, resulting in dissolution of the zeolite in the reaction mixture. Usually, it is considered that the yield can be improved as the value of $(Na_2O+K_2O)/SiO_2$ is lower, but the MSE-type zeolite can be obtained by setting the value of $(Na_2O+K_2O)/SiO_2$ to 0.15 or more in the present invention. As described above, the present inventors have found that MSE-type zeolites can be produced using tetraethylammonium ions and a seed crystal in combination, by limiting the composition of the reaction mixture, in particular $(Na_2O+K_2O)/SiO_2$, $K_2O/(Na_2O+K_2O)$ and $TEA_2O/SiO_2$, to a narrow range. In addition, MSE-type zeolites can be easily obtained in the present invention, even when the molar ratio of $SiO_2/Al_2O_3$ in the reaction mixture is relatively low, for example, 40 or less, or 30 or less.

As the order of the respective raw materials added when preparing the reaction mixture, a method by which a homogeneous reaction mixture is easily obtained may be adopted. For example, an alkali source and tetraethylammonium ions are dissolved in water and an alumina source and a silica source are added to the obtained alkaline solution, followed by stirring and mixing, whereby a homogeneous reaction mixture can be obtained. There are no particular restrictions on the temperature at which reaction mixture is prepared and it is generally possible to carry out the preparation at room temperature (15° C. or more and 30° C. or less).

When adding an alumina source and a silica source, for example, the alumina source can be added first and after completion of the addition the silica source can be added. In addition, both these can also be added in the reverse order. Alternatively, the alumina source and the silica source can be added simultaneously. It is preferable that the alumina source is added first and then the silica source is added since a more homogeneous reaction mixture can be prepared.

The reaction mixture may or may not be heated prior to the addition of the seed crystal (preheating). Although the synthesis of MSE-type zeolite is possible even when preheating is not performed, it is preferable to perform preheating because high-purity crystals are obtained. In the case of preheating, the heating condition is preferably 50° C. or more and 100° C. or less from the viewpoint of improvement of purity by preheating and shortening of the production time. From the same viewpoint, preheating time is preferably about 12 hours or more and 60 hours or less. Preheating is preferably carried out in a hermetically sealed manner. Here, being in a hermetically sealed manner means that there is no entrance or exit of gas such as water vapor to or from the outside of the system and, for example, it suffices that outflow or inflow of gas such as water vapor to or from the outside of the system is prevented. Preheating is preferably performed by a static method.

By using tetraethylammonium ions, various types of seed crystals can be used. MSE-type zeolites are effective as a seed crystal, regardless of difference in production methods. In particular, the MSE-type zeolite obtained by the method of the present invention (steps (1) to (3) above) can be used (recycled) as a seed crystal. The MSE-type zeolites synthesized by the methods disclosed in Patent Documents 1 and 2 and Non-Patent Documents 1 to 4 (those produced using OSDAs) are also effective and that obtained by the method disclosed in Non-Patent Document 5 (that produced without using an OSDA) is also effective. The seed crystal used in the instant production method may be a seed crystal produced by the method of the present invention or a seed crystal produced by a method other than the method of the present invention. The seed crystal produced by using an OSDA may be a seed crystal which has been calcined so as to contain no OSDA or may be an unfired seed crystal. In particular, being able to use an unfired seed crystal as the seed crystal produced using an OSDA is highly advantageous in the synthesis in which MSE-type zeolites are produced repeatedly using the resulting MSE-type zeolite as the seed crystal, in that there is no need to calcine the seed crystal. These can be used as one type or combination of two or more types. The calcination of the seed crystal produced using an OSDA is not particularly limited, but is generally performed, for example, in air at 500° C. or more and 700° C. or less for 3 hours or longer and 24 hours or shorter.

The $SiO_2/Al_2O_3$ ratio (molar ratio) of the MSE-type zeolite, a seed crystal, is 12 or more and 25 or less. The $SiO_2/Al_2O_3$ ratio of the MSE-type zeolite synthesized by using an OSDA in a conventional method is usually about 18 or more and 25 or less and the $SiO_2/Al_2O_3$ ratio of the MSE-type zeolite synthesized not using an OSDA is about 12 or more to 15 or less. The $SiO_2/Al_2O_3$ ratio of the MSE-type zeolite obtained by the method of the present invention is hardly affected by the $SiO_2/Al_2O_3$ ratios of these seed crystals, is usually 12 or more and 20 or less and more preferably 12 or more and 17 or less.

The seed crystal is added to the reaction mixture at a ratio of 5% by mass or more and 30% by mass or less with respect to the silica component in the above-mentioned reaction mixture having the above-mentioned composition. Within this range, an MSE-type zeolite having high purity can be produced. From this viewpoint, a seed crystal is added to the reaction mixture having the above-mentioned composition preferably at a ratio of 5% by mass or more and 25% by mass or less, and more preferably, at a ratio of 10% by mass or more and 20% by mass or less with respect to the silica component in the reaction mixture.

After the seed crystal is added to the reaction mixture, the resulting mixture is heated in a hermetically sealed manner. When stirring is performed in order to equalize the reaction mixture temperatures, stirring may be performed in a step of heating in a hermetically sealed manner. The mixture can be performed by mixing with a stirring blade or by rotation of the vessel. The stirring strength and the number of revolutions may be adjusted depending on the uniformity of the temperature and the generation status of impurities. Instead of constant stirring, intermittent stirring may be used. Combination of preheating and stirring may make industrial mass production even easier, as described above. In either the case of performing crystallization under a standing state or the case of performing crystallization under a stirred state, the temperature condition of heating for crystallization is preferably 100° C. or more in order to efficiently obtain an MSE-type zeolite. The temperature is preferably less than 200° C., from the viewpoint of economic advantage without requiring an autoclave capable of withstanding high pressure and suppressing the generation of impurities. In this respect, the temperature condition is more preferably 120° C. or more and 180° C. or less. The heating time is not critical in the present production method and the reaction mixture may be heated until an MSE zeolite exhibiting sufficiently high crystallinity is generated. In general, the MSE zeolite exhibiting satisfactory crystallinity is obtained by heating for about 120 hours or longer and 240 hours or shorter.

The MSE-type zeolite obtained by the method of the present invention is promising as a solid acid catalyst or an adsorbent, more particularly as a catalyst for catalytic cracking of paraffin, for example, as a cracking catalyst of long chain hydrocarbons such as hexane in the petrochemical industry, and is also promising as a hydrocarbon trap for purifying exhaust gas of various internal combustion engines such as gasoline engines and diesel engines. The MSE-type zeolite obtained by the method of the present invention preferably has a specific surface area of, for example, 450 m$^2$/g or more and 650 m$^2$/g or less, particularly, 500 m$^2$/g or more and 620 m$^2$/g or less, from the viewpoint of improving the performance when used as a catalyst. The MSE-type zeolite preferably has a pore volume of, for example, 0.17 cm$^3$/g or more and 0.23 cm$^3$/g or less, in particular, 0.18 cm$^3$/g or more and 0.22 cm$^3$/g or less from the same viewpoint. These specific surface area and pore volume can be measured under the conditions described in the Examples described below.

Figure 3:
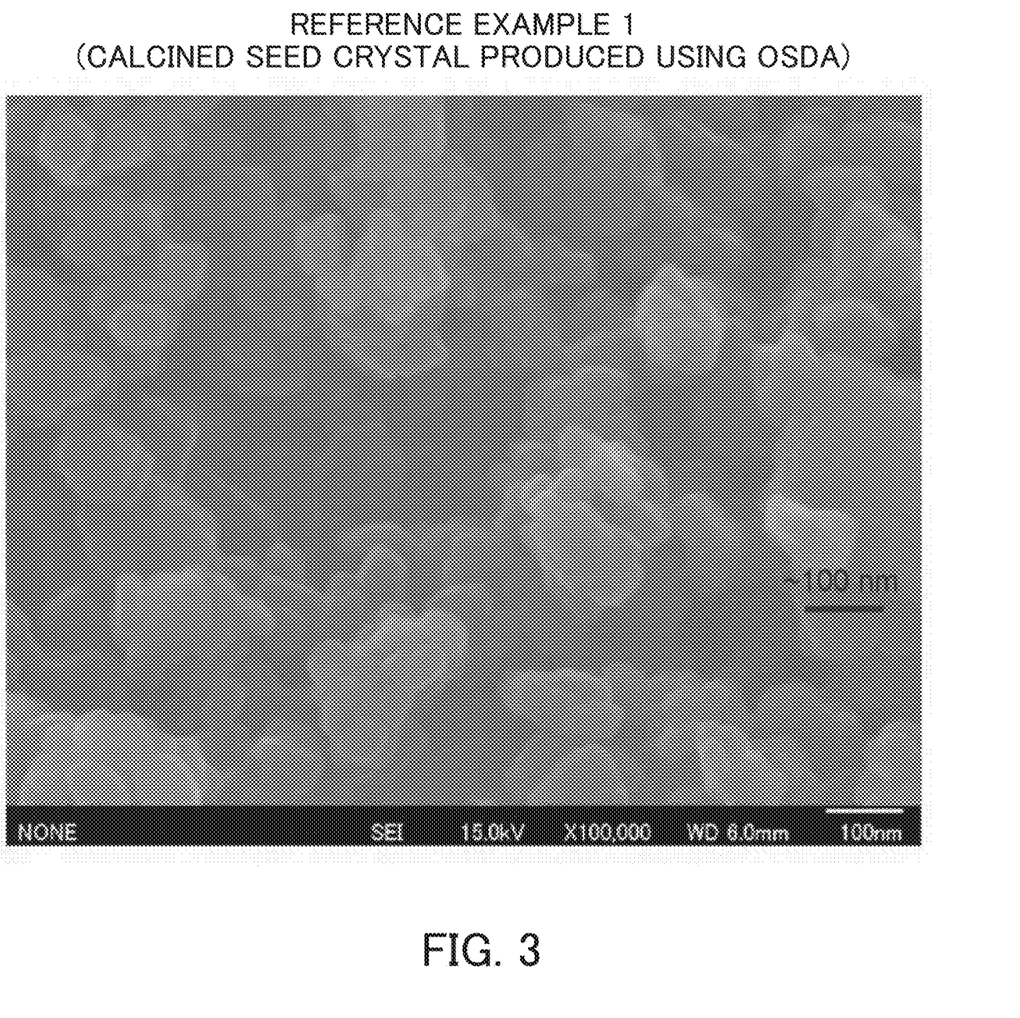
FIG. 3 is an SEM photograph of a calcined product of the MSE-type zeolite for a seed crystal synthesized in Reference Example 1.
Figure 5:
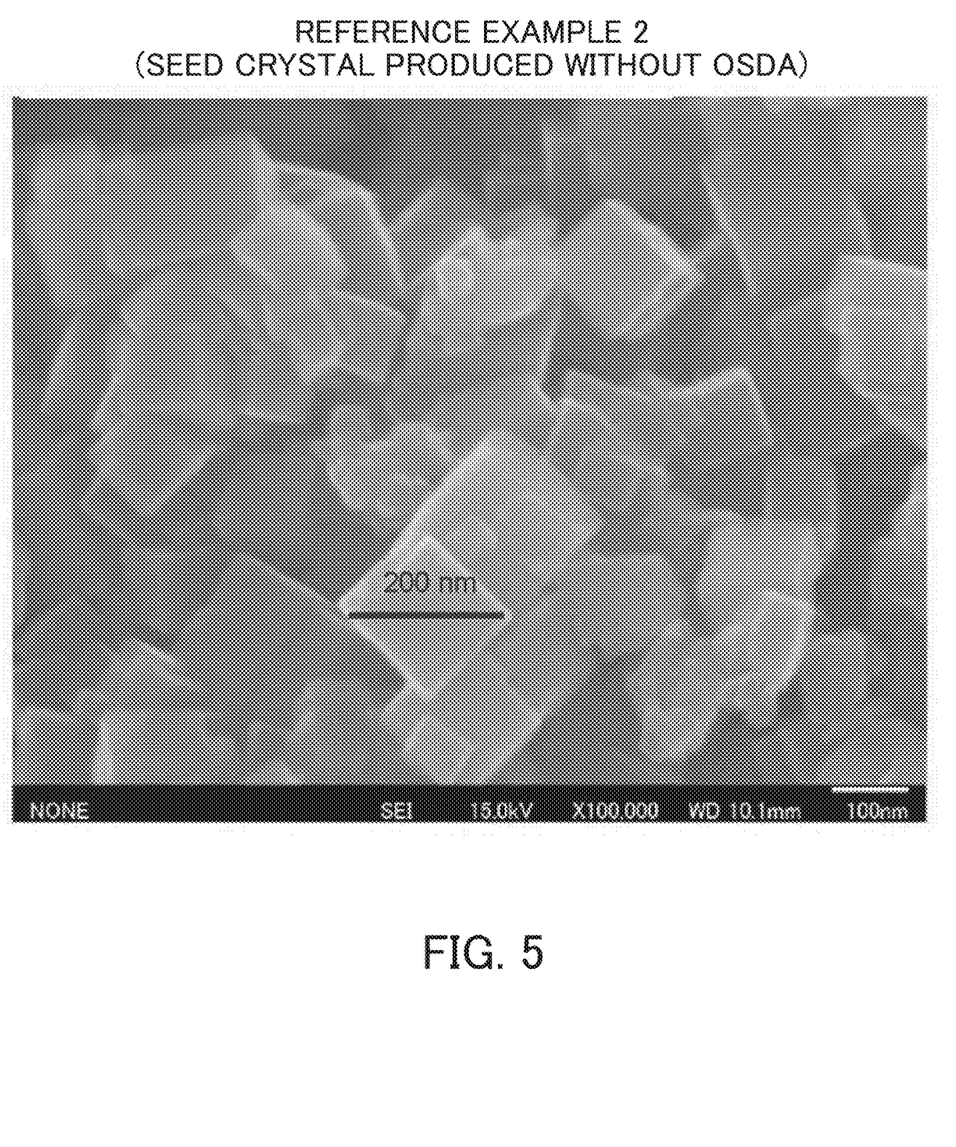
FIG. 5 is an X-ray diffraction pattern of the MSE-type zeolite for a seed crystal synthesized in Reference Example 2.
Figure 8:
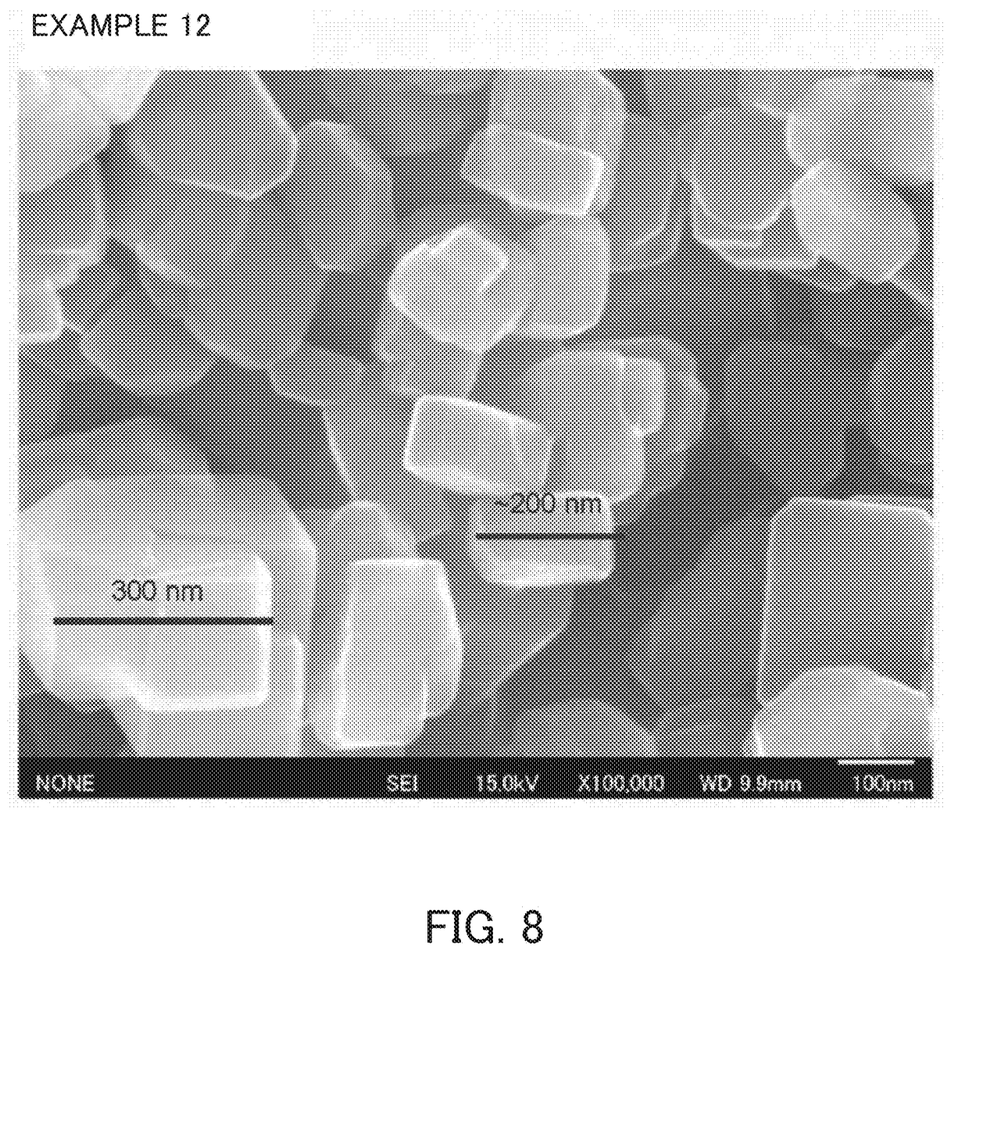
FIG. 8 is an SEM-photograph of the product of Example 12.

As indicated in FIG. 3 described below, the MSE-type zeolite using an OSDA disclosed in Patent Document 1 has a relatively amorphous and rounded shape and the MSE-type zeolite produced without using an OSDA disclosed in Non-Patent Document 5 has a rectangular parallelepiped shape as indicated in FIG. 5, whereas the MSE-type zeolite obtained by the present production method usually has a rectangular parallelepiped shape with rounded corners as indicated in FIG. 8. In regard to the crystal size of the MSE-type zeolite obtained by the production method of the present invention, for instance, the maximum length of crystal particles (the length of the longest line segment among the line segments connecting arbitrary two points on the crystal particle surface in the image observed by the scanning electron microscope) is, for example, about 100 nm or more and 400 nm or less.

EXAMPLES

Hereinafter, the present invention is disclosed in more detail with reference to the Examples. However, the scope of the present invention is not limited to such Examples. Analytical instruments used in the following Examples and Comparative Examples are as follows.

Powder X-ray diffractometer: Ultima IV manufactured by Rigaku, Cukα ray used, voltage: 40 kV, electric current: 30 mA, scan step: 0.02° and scan speed: 2°/min Composition analyzer: ICP-AES LIBERTY Series II manufactured by Varian, Inc. Nitrogen adsorption characteristics measurement apparatus: Autosorb iQ2-MP, manufactured by Qantachrome Instruments. After pretreatment in vacuo at 400° C. for 4 hours, adsorption isotherm was measured at liquid nitrogen temperature (−196° C.). Scanning electron microscope (SEM): Field emission type scanning electron microscope S-900 manufactured by Hitachi High-Technologies Corporation.

Reference Example 1 (Synthesis of Seed Crystal Using OSDA)

Figure 1:
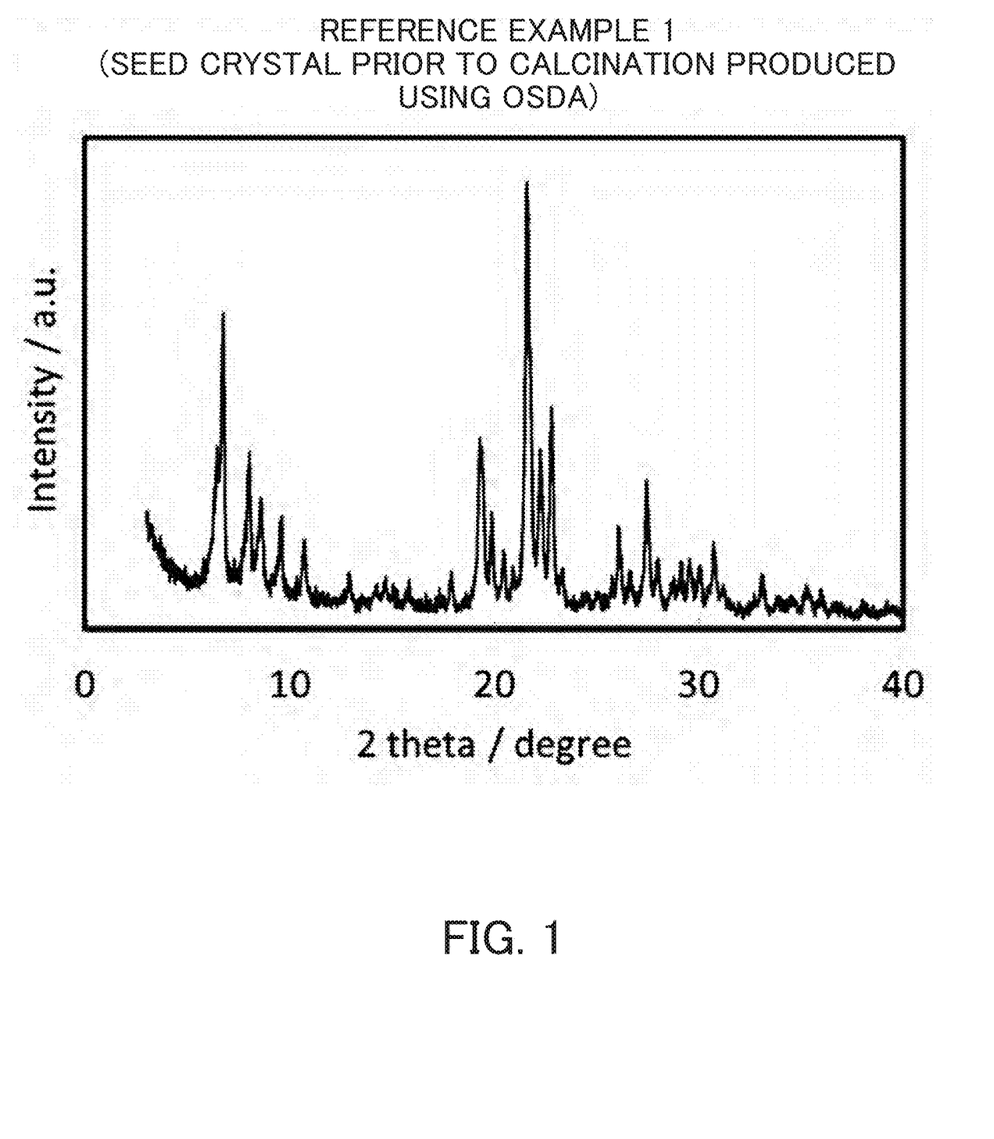
FIG. 1 is an X-ray diffraction pattern of an MSE-type zeolite for a seed crystal synthesized in Reference Example 1 prior to calcination.
Figure 2:
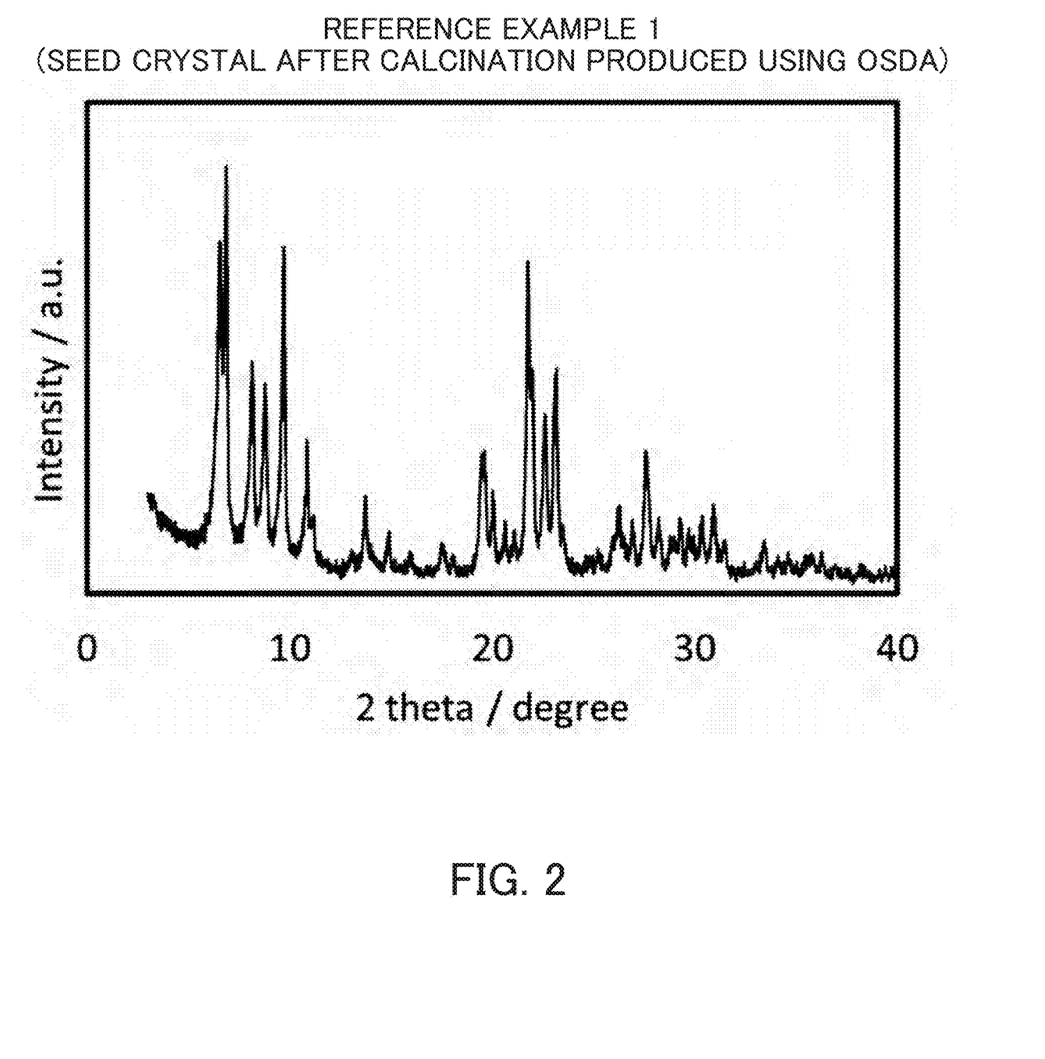
FIG. 2 is an X-ray diffraction pattern of the MSE-type zeolite for a seed crystal synthesized in Reference Example 1 after calcination.

According to the disclosure of Patent Document 1, N,N, N',N'-tetraethylbicyclo[2,2,2]octa-7-ene-2,3:5,6-dipyrrolidinium diiodide was used as an OSDA and colloidal silica, aluminum hydroxide and potassium hydroxide were used as sources of silica, alumina and alkali, respectively. Pure water was further added to prepare a reaction mixture, which was heated at 160° C. for 16 days by a static method to synthesize MCM-68. The $SiO_2/Al_2O_3$ molar ratio was 20. Powder X-ray diffraction patterns before and after calcination of this crystal are indicated in FIGS. 1 and 2, respectively. FIG. 3 indicates a photograph obtained by observing this seed crystal (calcined product) by SEM. The calcination of MCM-68 was carried out in air at 650° C. for 10 hours.

Reference Example 2 (Synthesis of Seed Crystal without Using OSDA)

Figure 4:
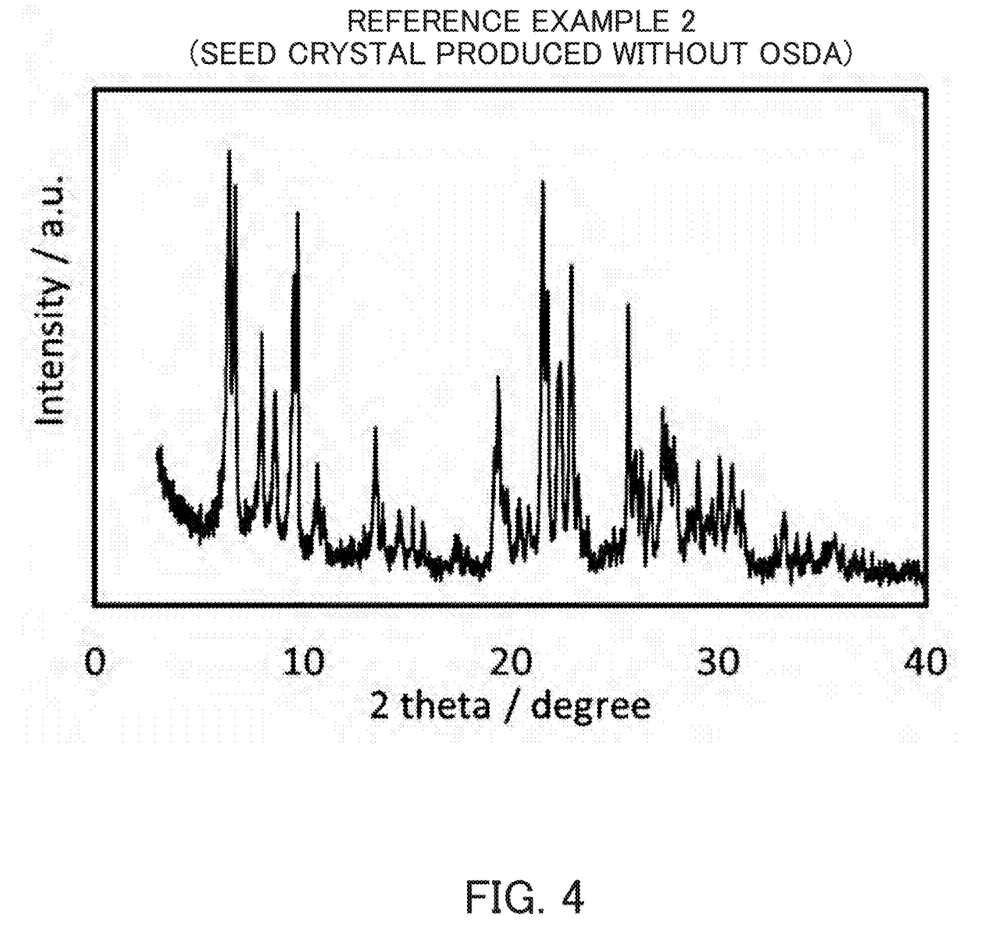
FIG. 4 is an X-ray diffraction pattern of an MSE-type zeolite for a seed crystal synthesized in Reference Example 2.

According to the description of Non-Patent Document 5, the calcination product of MCM-68 synthesized in Reference Example 1 was used as a seed crystal (10 wt % of a silica source was added), amorphous silica (Cab-O-Sil), sodium aluminate and sodium hydroxide and potassium hydroxide were used as a silica source, an alumina source and an alkali source, respectively, and further pure water was added to prepare a reaction mixture, which was then heated at 140° C. for 48 hours by a static method to synthesize an MSE-type zeolite. The $SiO_2/Al_2O_3$ molar ratio was 13.2. The powder X-ray diffraction pattern of this crystal is indicated in FIG. 4. An SEM photograph of this crystal is indicated in FIG. 5.

Example 1

Figure 6:
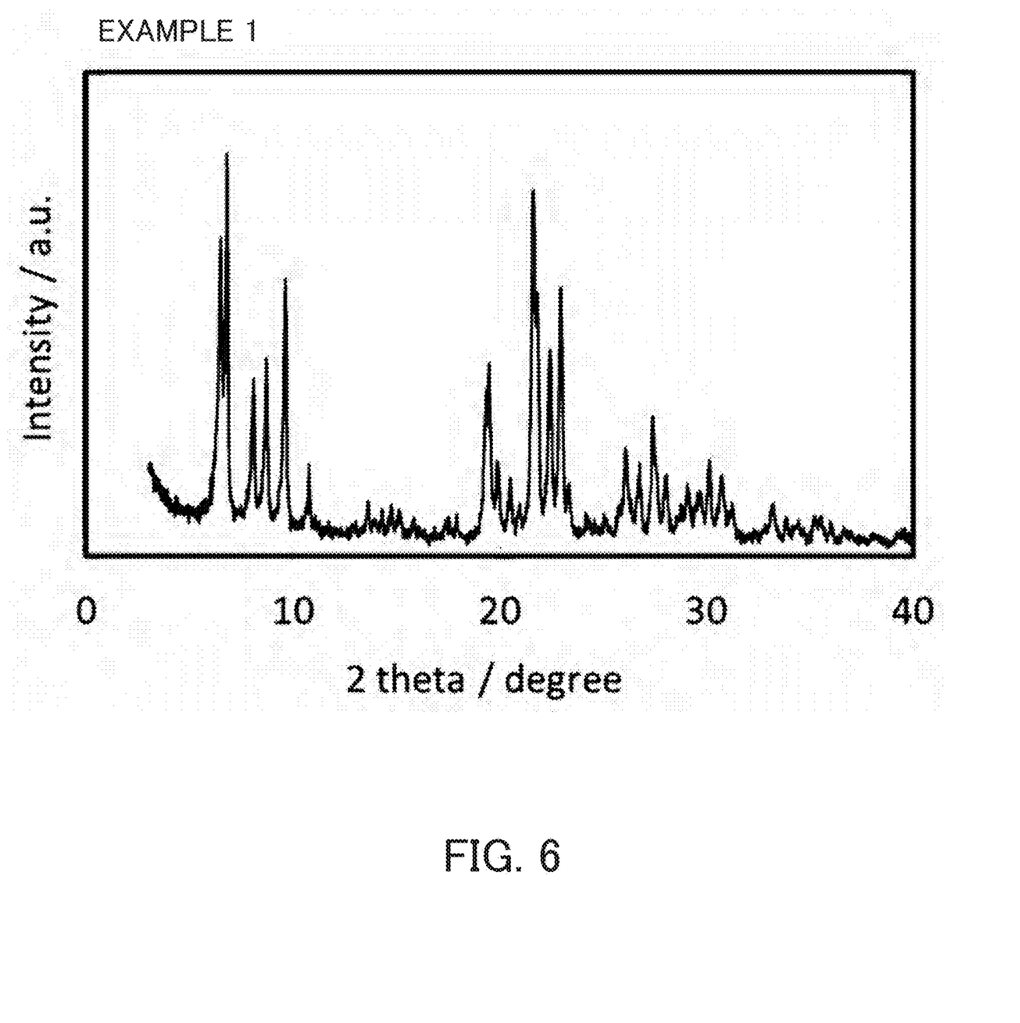
FIG. 6 is an X-ray diffraction pattern of the product of Example 1.

An alkaline aqueous solution was prepared by adding 0.645 g of a 50 w/v % aqueous sodium hydroxide solution, 0.217 g of a 50 wt % aqueous potassium hydroxide solution and 1.433 g of a 35 wt % aqueous tetraethylammonium hydroxide solution to 2.73 g of pure water and 0.051 g of amorphous aluminum hydroxide powder was added thereto and uniformly stirred and dissolved. To this mixed aqueous solution, 0.933 g of amorphous silica (Cab-O-Sil) was added in small portions and stirred and mixed to prepare a reaction mixture. The composition of this reaction mixture is as indicated in Table 1. This was sealed in a Teflon (registered trademark)-lined stainless steel autoclave and preheated in an electric furnace at 80° C. for 24 hours in a static method. The autoclave was then taken out and rapidly cooled. 0.186 g of calcined MCM-68 prepared in Reference Example 1 was added to the preheated reaction mixture as a seed crystal and the mixture was uniformly stirred and mixed. This was again placed in a Teflon (registered trademark)-lined stainless steel autoclave, sealed and subjected to static heating in an electric furnace at 160° C. for 7 days. The product was filtered, washed and dried and then the product was measured by an X-ray diffractometer to find that the product was an MSE-type zeolite as indicated in FIG. 6. The $SiO_2/Al_2O_3$ molar ratio and the pore characteristics obtained from the nitrogen adsorption characteristics were as indicated in Table 1.

Examples 2 to 12

Figure 7:
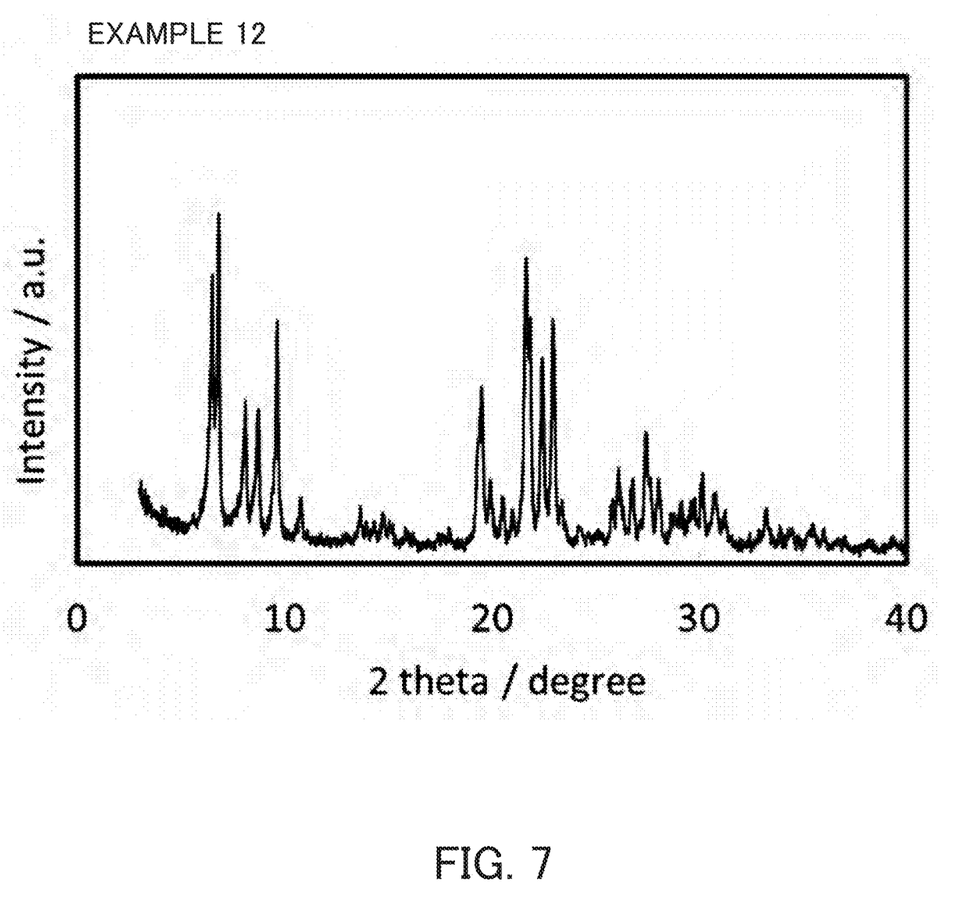
FIG. 7 is an X-ray diffraction pattern of the product of Example 12.

Reaction mixtures having the compositions indicated in Table 1 were prepared in the same manner as in Example 1 and were preheated by the static method under the same conditions as in Example 1, except that the used amounts of raw materials used in Example 1 were changed. After rapid cooling, calcined MCM-68 prepared in Reference Example 1 was added in each of the amounts indicated in Table 1 as a seed crystal to each of the preheated reaction mixtures and mixed uniformly. Thereafter, each of the reaction mixtures was subjected to static heat in the same manner as in Example 1 under the conditions disclosed in Table 1. The product was an MSE-type zeolite as indicated in Table 1 and the $SiO_2/Al_2O_3$ molar ratio thereof and the pore characteristics determined from the nitrogen-adsorption characteristics of the MSE-type zeolites were as indicated in Table 1. An X-ray diffraction pattern of Example 12 product is indicated in FIG. 7. An SEM-photograph of the product of Example 12 is indicated in FIG. 8.

Example 13

Crystallization was carried out with the same method and under the same conditions as in Example 1 except that the calcined MCM-68 prepared in Reference Example 1 without preheating the same reaction mixture as in Example 1 was added as a seed crystal. The product was an MSE-type zeolite containing a trace amount of beta zeolite.

Example 14

Crystallization was carried out with the same method and under the same conditions as in Example 1 except that unfired MCM-68 prepared in Reference Example 1 was used as a seed crystal. The product was an MSE-type zeolite containing a trace amount of beta zeolite and the $SiO_2/Al_2O_3$ molar ratio thereof and the pore characteristics determined from the nitrogen-adsorption characteristics were as indicated in Table 1.

Example 15

Figure 9:
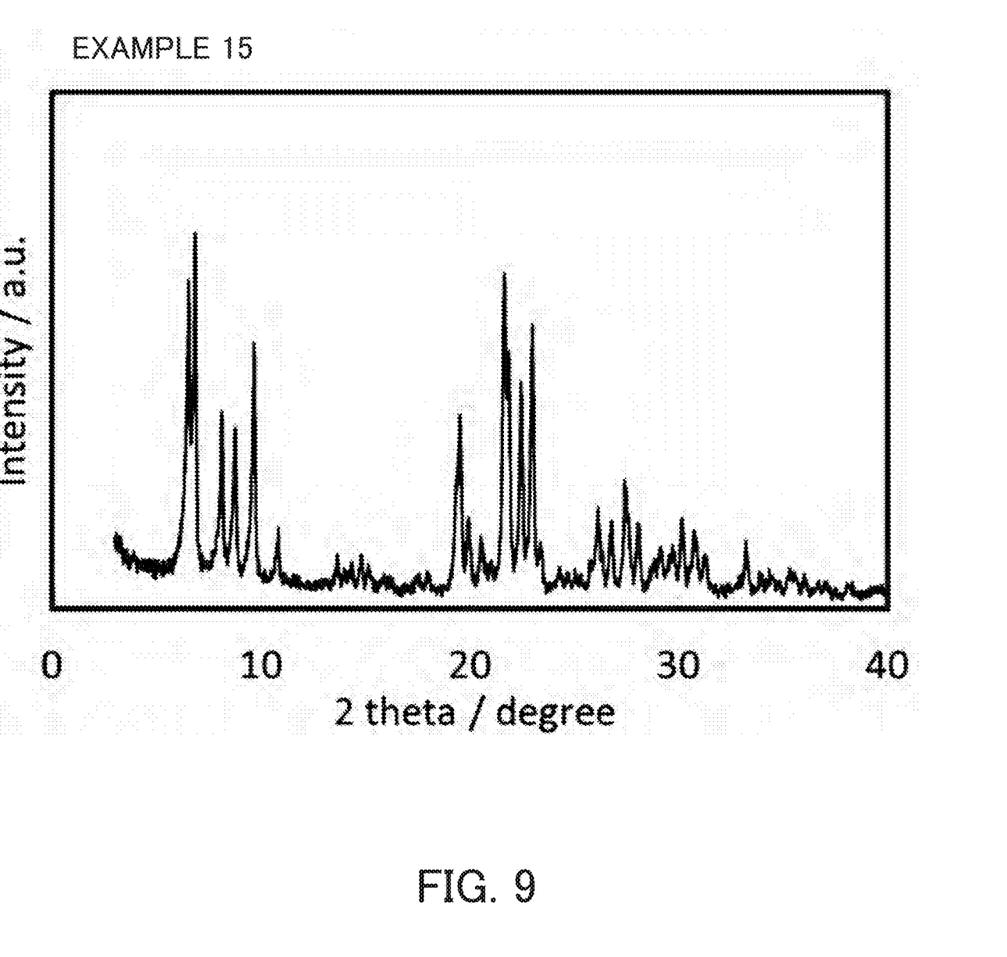
FIG. 9 is an X-ray diffraction pattern of a product synthesized in Example 15.

Crystallization was carried out with the same method and under the same conditions as in Example 1 except that unfired MSE-type zeolite synthesized in Example 1 was used as a seed crystal and the preheating time was 48 hours. The product was an MSE-type zeolite containing a trace amount of beta zeolite. The product was an MSE-type zeolite as indicated in FIG. 9 and the $SiO_2/Al_2O_3$ molar ratio thereof and the pore characteristics determined from the nitrogen-adsorption characteristics were as indicated in Table 1.

Example 16

Figure 10:
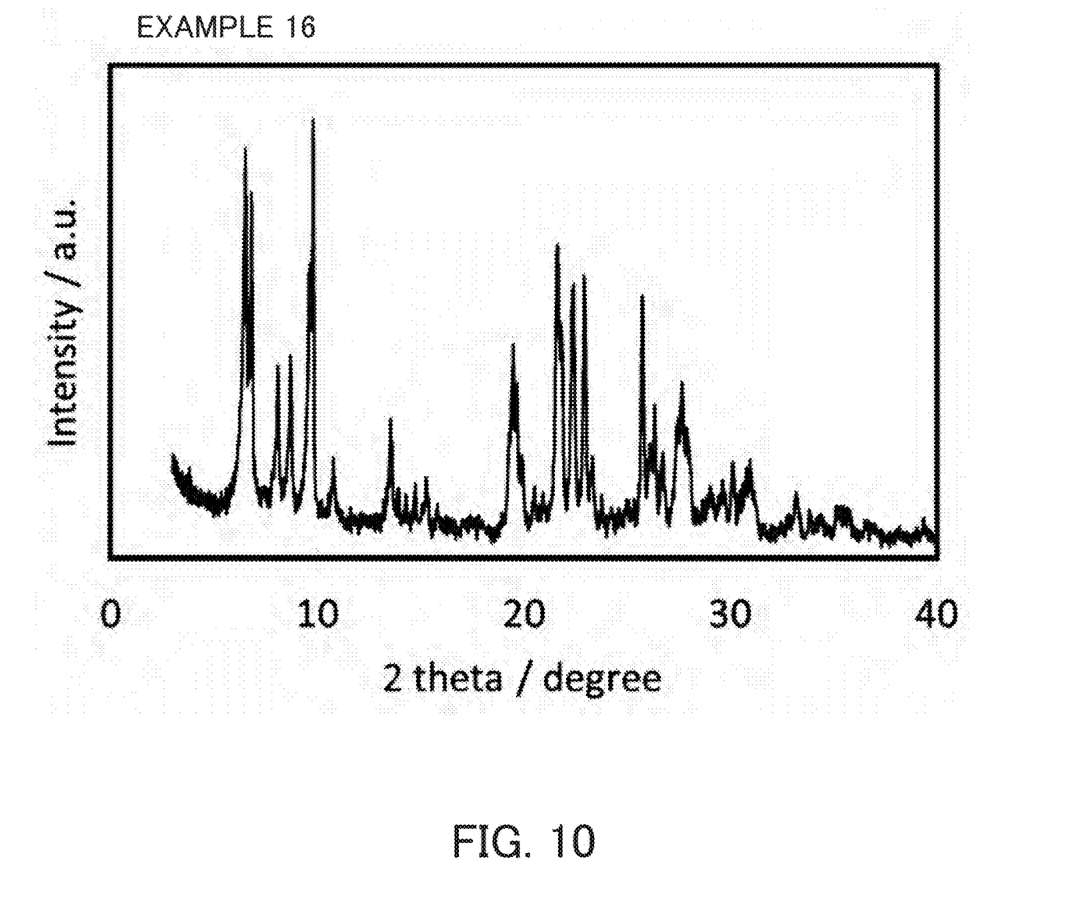
FIG. 10 is an X-ray diffraction pattern of a product synthesized in Example 16.

Crystallization was carried out with the same method and under the same conditions as in Example 1 except that the MSE-type zeolite prepared without using an OSDA in Reference Example 2 was used as a seed crystal. The product was an MSE-type zeolite as indicated in FIG. 10 and the $SiO_2/Al_2O_3$ molar ratio thereof and the pore characteristics determined from the nitrogen-adsorption characteristics were as indicated in Table 1.

Comparative Example 1

Crystallization was carried out with the same method and under the same conditions as in Example 1 except that reaction mixture was used in which the $TEA_2O/SiO_2$ molar ratio of the reaction mixture composition indicated in Table 1 was 0.05. The product was as indicated in Table 2.

Comparative Example 2

Crystallization was carried out with the same method and under the same conditions as in Example 1 except that a reaction mixture was used in which the $TEA_2O/SiO_2$ molar ratio of the reaction mixture composition indicated in Table 1 was 0 (no tetraethylammonium hydroxide was added). The product was as indicated in Table 2.

Comparative Example 3

After preheating using the same reaction mixture as in Example 1, crystallization was performed with the same method and under the same conditions as in Example 1 without adding a seed crystal. The product was as indicated in Table 2.

Comparative Examples 4 and 5

After preheating by using the same reaction mixture as in Example 1, crystallization was carried out with the same method and under the same conditions as in Example 1, except that the molar ratio of $K_2O/(Na_2O+K_2O)$ of the reaction mixture composition indicated in Table 2 was 0.75 and 0, respectively. The products were as indicated in Table 2. In Comparative Example 4, most of the product was unidentified impurities and MCM-68 was contained only in a trace amount.

TABLE 1

| Example | Reaction mixture composition (Molar ratio) | | | | | Seed crystal Added amount (% by mass) | Preheating conditions | | Crystallization conditions | | Product | | | |
|---|---|---|---|---|---|---|---|---|---|---|---|---|---|---|
| | $SiO_2/Al_2O_3$ | $(Na_2O + K_2O)/SiO_2$ | $K_2O/(Na_2O + K_2O)$ | $TEA_2O/SiO_2$ | $H_2O/SiO_2$ | | Temperature (°C.) | Time (h) | Temperature (°C.) | Time (d) | Zeolite | $SiO_2/Al_2O_3$ molar ratio | Specific surface area (m²/g) | Pore volume (cm³/g) |
| 1 | 50 | 0.250 | 0.25 | 0.11 | 15 | 20 | 80 | 24 | 160 | 7 | MCM-68 | 16.1 | 544 | 0.20 |
| 2 | 50 | 0.240 | 0.25 | 0.11 | 15 | 20 | 80 | 24 | 160 | 7 | MCM-68 | 17.3 | 604 | 0.22 |
| 3 | 50 | 0.225 | 0.25 | 0.12 | 15 | 20 | 80 | 24 | 160 | 7 | MCM-68 + Trace amount of beta | | | |
| 4 | 50 | 0.250 | 0.50 | 0.11 | 15 | 20 | 80 | 24 | 160 | 7 | MCM-68 | 16.4 | 534 | 0.19 |
| 5 | 50 | 0.250 | 0.15 | 0.11 | 15 | 20 | 80 | 24 | 160 | 7 | MCM-68 | 16.3 | 539 | 0.19 |
| 6 | 50 | 0.250 | 0.25 | 0.11 | 15 | 15 | 80 | 24 | 160 | 7 | MCM-68 | 16.5 | 540 | 0.20 |
| 7 | 50 | 0.250 | 0.25 | 0.11 | 15 | 10 | 80 | 24 | 160 | 7 | MCM-68 + Trace amount of beta | | | |
| 8 | 40 | 0.250 | 0.25 | 0.11 | 15 | 20 | 80 | 24 | 160 | 7 | MCM-68 | 16.3 | 539 | 0.19 |
| 9 | 40 | 0.238 | 0.25 | 0.11 | 15 | 20 | 80 | 24 | 160 | 7 | MCM-68 | 16.9 | 557 | 0.21 |
| 10 | 40 | 0.280 | 0.25 | 0.11 | 15 | 20 | 80 | 24 | 160 | 7 | MCM-68 | 14.6 | 555 | 0.20 |
| 11 | 30 | 0.250 | 0.25 | 0.11 | 15 | 20 | 80 | 24 | 160 | 7 | MCM-68 | 15.2 | 601 | 0.21 |
| 12 | 20 | 0.250 | 0.25 | 0.11 | 15 | 20 | 80 | 24 | 160 | 7 | MCM-68 | 13.9 | 525 | 0.19 |
| 13 | 50 | 0.250 | 0.25 | 0.11 | 15 | 20 | — | — | 160 | 7 | MCM-68 + Trace amount of beta | | | |
| 14 | 50 | 0.250 | 0.25 | 0.11 | 15 | 20 | 80 | 24 | 160 | 7 | MCM-68 + Trace amount of beta | 16.1 | 520 | 0.19 |
| 15 | 50 | 0.250 | 0.25 | 0.11 | 15 | 20 | 80 | 48 | 160 | 7 | MCM-68 | 14.8 | 546 | 0.20 |
| 16 | 50 | 0.25 | 0.25 | 0.11 | 15 | 20 | 80 | 24 | 160 | 7 | MCM-68 | 15.1 | 530 | 0.19 |

TABLE 2

| Comparative Example | Reaction mixture composition (Molar ratio) | | | | | Seed crystal Added amount (% by mass) | Preheating conditions | | Crystallization conditions | | Product Zeolite |
|---|---|---|---|---|---|---|---|---|---|---|---|
| | SiO$_2$/Al$_2$O$_3$ | (Na$_2$O + K$_2$O)/SiO$_2$ | K$_2$O/(Na$_2$O + K$_2$O) | TEA$_2$O/SiO$_2$ | H$_2$O/SiO$_2$ | | Temperature (° C.) | Time (h) | Temperature (° C.) | Time (d) | |
| 1 | 50 | 0.200 | 0.25 | 0.05 | 15 | 20 | 80 | 24 | 160 | 7 | Mordenite + Beta |
| 2 | 50 | 0.250 | 0.25 | 0 | 15 | 20 | 80 | 24 | 160 | 7 | Mordenite |
| 3 | 50 | 0.250 | 0.25 | 0.11 | 15 | 0 | 80 | 24 | 160 | 7 | Mordenite |
| 4 | 50 | 0.225 | 0.75 | 0.12 | 15 | 20 | 80 | 24 | 160 | 7 | Unidentified impurity + MCM-68 |
| 5 | 50 | 0.250 | 0.00 | 0.11 | 15 | 20 | 80 | 24 | 160 | 7 | Beta |

From the results of Tables 1 and 2, it can be seen that using tetraethylammonium ions and a seed crystal together with a reaction mixture having a specific composition in the present method enables to efficiently produce an MSE-type zeolite even when any of various seed crystals is used.

The invention claimed is:

1. A method for producing an MSE-type zeolite comprising the steps of:
   (1) mixing a silica source, an alumina source, an alkali source, tetraethylammonium ions and water so as to obtain a reaction mixture having a composition represented by molar ratios indicated below:
   SiO$_2$/Al$_2$O$_3$=10 or more and 100 or less,
   (Na$_2$O+K$_2$O)/SiO$_2$=0.15 or more and 0.50 or less,
   K$_2$O/(Na$_2$O+K$_2$O)=0.05 or more and 0.7 or less,
   TEA$_2$O/SiO$_2$=0.08 or more and 0.20 or less and
   H$_2$O/SiO$_2$=5 or more and 50 or less
   (in the formula, TEA represents tetraethylammonium ion);
   (2) using an MSE-type zeolite as a seed crystal and adding this to the reaction mixture at a ratio of 5% by mass or more and 30% by mass or less with respect to the silica component in the reaction mixture; and
   (3) heating the reaction mixture to which the seed crystal has been added, at a temperature of not less than 100° C. and less than 200° C. in a hermetically sealed manner.

2. The method for producing an MSE-type zeolite according to claim 1, wherein the reaction mixture containing no seed crystal is preheated at a temperature of not less than 50° C. and not more than 100° C. in a hermetically sealed manner, followed by adding a seed crystal to the reaction mixture and heating the reaction mixture at a temperature of not less than 100° C. and less than 200° C. in a hermetically sealed manner.

3. The method for producing an MSE-type zeolite according to claim 1, wherein the seed crystal is an MSE-type zeolite produced by the steps (1) to (3).

4. The method for producing an MSE-type zeolite according to claim 1, wherein the seed crystal is an MSE-type zeolite obtained in a step other than the steps (1) to (3).

5. The method for producing an MSE-type zeolite according to claim 1, wherein the reaction mixture is stirred in the step of heating in a hermetically sealed manner.

\* \* \* \* \*